United States Patent
Berhe et al.

(10) Patent No.: US 9,903,730 B1
(45) Date of Patent: Feb. 27, 2018

(54) METHODS, DEVICES, AND SYSTEMS FOR DETERMINING AN ESTIMATED TIME OF DEPARTURE AND ARRIVAL BASED ON INFORMATION ASSOCIATED WITH THE DESTINATION

(71) Applicants: Tamerat S. Berhe, Loma Linda, CA (US); Bennett Jackson, East Rutherford, NJ (US); Natnael S. Berhe, Loma Linda, CA (US)

(72) Inventors: Tamerat S. Berhe, Loma Linda, CA (US); Bennett Jackson, East Rutherford, NJ (US); Natnael S. Berhe, Loma Linda, CA (US)

( * ) Notice: Subject to any disclaimer, the term of this patent is extended or adjusted under 35 U.S.C. 154(b) by 12 days.

(21) Appl. No.: 15/362,581

(22) Filed: Nov. 28, 2016

Related U.S. Application Data (60) Provisional application No. 62/378,912, filed on Aug. 24, 2016.

(51) Int. Cl.
*G01C 21/34* (2006.01)
*H04L 29/08* (2006.01)
*G01C 21/36* (2006.01)
*G06Q 50/30* (2012.01)

(52) U.S. Cl.
CPC ..... *G01C 21/3492* (2013.01); *G01C 21/3626* (2013.01); *H04L 67/26* (2013.01); *G06Q 50/30* (2013.01)

(58) Field of Classification Search
CPC . G01C 21/3492; G01C 21/3626; H04L 67/26; G06Q 50/30

USPC .......................................................... 701/423
See application file for complete search history.

(56) References Cited

U.S. PATENT DOCUMENTS

| | | | | |
|---|---|---|---|---|
| 5,126,941 A | * | 6/1992 | Gurmu | G01C 21/3492 340/989 |
| 6,317,686 B1 | * | 11/2001 | Ran | G01C 21/3691 701/117 |
| 8,024,111 B1 | * | 9/2011 | Meadows | G01C 21/3492 340/905 |
| 8,606,517 B1 | * | 12/2013 | Ehrlacher | G08G 1/096811 701/117 |
| 9,163,952 B2 | * | 10/2015 | Viola | G01C 21/3617 |
| 2012/0316763 A1 | * | 12/2012 | Haynes, III | G01C 21/3492 701/117 |

(Continued)

OTHER PUBLICATIONS

Chen et al., Research on Anticipatory Route Guidance, 19991, IEEE, p. 427-439.*

(Continued)

*Primary Examiner* — McDieunel Marc
(74) *Attorney, Agent, or Firm* — Brooks Acordia IP Law, P.C.; Pejman Yedidsion (57) ABSTRACT

Systems, devices, and methods for transmitting a selected route of travel associated with a user equipment to allow the user of the user equipment to arrive at the destination location on time, where the route is based on a determined departure time for a predetermined arrival time at a selected destination location. Additionally, the determination is based on the current location of the user equipment and real-time data pertaining to the selected destination location, where the real-time data comprises detected changes in surrounding environments at the selected destination location.

20 Claims, 6 Drawing Sheets

(56) References Cited

U.S. PATENT DOCUMENTS

2015/0141043 A1* 5/2015 Abramson ............. G01C 21/34
455/456.1

OTHER PUBLICATIONS

Shalaby et al., Transferability of Travel Time Models and Provision of Time Information Real-Time Arrival, 2001, IEEE, p. 982-987.*
Karbassi et al., Vehicle Route Prediction and Time of Arrival Estimation Techniques for Improved Transportation System Management 2003, IEEE, p. 511-516.*
Nuzzolo et al., Transit Trip Planners:real-time strategy-based path recommendation, 2015, IEEE, p. 196-201.*

* cited by examiner

METHODS, DEVICES, AND SYSTEMS FOR DETERMINING AN ESTIMATED TIME OF DEPARTURE AND ARRIVAL BASED ON INFORMATION ASSOCIATED WITH THE DESTINATION

CROSS-REFERENCE TO RELATED APPLICATIONS

This application claims priority to and benefit of Provisional Patent Application No. 62/378,912 filed Aug. 24, 2016, which is hereby incorporated by reference for all purposes.

TECHNICAL FIELD OF ENDEAVOR

The present application relates to the field of transportation and technology associated with determining wait times at transportation facilities. More particularly, to determining an estimated time of departure from a specified location in order to arrive at a destination, based on a set of information associated with the destination.

BACKGROUND

Currently, travelers and consumers are not privy to real time information related to wait times at different lines or queues in order to accomplish their travel plans on a timely fashion. A traveler or user is not able to anticipate travel time to, for example, an airport, and wait times at lines at the exemplary airport. Methods and devices for providing information related to the travel time to the destination is currently present, however, potential wait time before clearing a waiting line and hence arriving at the destination transportation facility is lacking. For example, flights are often missed by misjudging the time in which it will take a traveler to get (a) to the airport and/or (b) how long, once at the airport, it will take the traveler to make it through the check-in and TSA/Security lines.

SUMMARY

Embodiments may include methods, systems, and devices where, for example, a device embodiment may include a processor and addressable memory, the addressable memory comprising a set of one or more rules, where the device may be in communication with a plurality of detection equipment having a transmitter and a user equipment having a processor and addressable memory. Additionally, the processor of the device may be configured to: receive, from the plurality of detection equipment, real-time data pertaining to a selected destination location, where the real-time data may comprise detected changes in surrounding environments at the selected destination location associated with length of traversal time; select a route of travel based on the received real-time data pertaining to the selected destination location, live traffic info associated with a selected departure location, and live traffic info associated with the selected destination location; determine a departure time for a predetermined arrival time at the selected destination location, the determination based on the selected route of travel, the selected departure location, and the selected destination location; and transmit, to the user equipment, the determined departure time for the predetermined arrival time and the selected route of travel associated with the user equipment, thereby allowing the user of the user equipment to depart from the selected departure location at a specified time in order to arrive at the selected destination location at the predetermined arrival time.

The device embodiment may further be configured to determine a departure time for a predetermined arrival time based on prediction data associated with the selected destination location, where the prediction data comprises previously collected real-time data and is received by the device on a continual basis. Optionally, the real-time data and the previously collected real-time data may be length of traversal time information related to how fast a line is moving and at what rate the line was growing. Additionally, the real-time data may be traversal information for the selected destination location and the prediction data may be traversal information previously collected for the selected destination location.

In another device embodiment, the real-time data may be collected from a plurality of other user equipment present at the selected destination location. Additionally, the plurality of detection equipment may be a set of one or more sensors where the detected changes in surrounding environments at the selected destination location may be based on data received from the set of one or more sensors and the detected changes in surrounding environments at the selected destination location may be further based on a flow of movement within a specified area. Optionally, the device may be further configured to determine line wait time information based on the flow of movement within the specified area where the line wait time information may be further based on historical information associated with the specified area.

Embodiments include methods, systems, and devices where, for example a method embodiment may include, not necessarily in this order, the steps of: (a) receiving, by a computing device comprising a processor and addressable memory, from a plurality of detection equipment, real-time data pertaining to a selected destination location, where the real-time data may comprise detected changes in surrounding environments at the selected destination location associated with length of traversal time; (b) selecting, by the computing device, a route of travel based on the received real-time data pertaining to the selected destination location, live traffic info associated with a selected departure location, and live traffic info associated with the selected destination location; (c) determining, by the computing device, a departure time for a predetermined arrival time at the selected destination location, the determination based on the selected route of travel, the selected departure location, and the selected destination location; and (d) transmitting, by the computing device to the user equipment, the determined departure time for the predetermined arrival time and the selected route of travel associated with the user equipment, thereby allowing the user of the user equipment to depart from the selected departure location at a specified time in order to arrive at the selected destination location at the predetermined arrival time.

Additionally, the method embodiment may determine a departure time for a predetermined arrival time further based on prediction data associated with the selected destination location, where the prediction data may comprise previously collected real-time data and may be received by the computing device on a continual basis. Additionally, the real-time data and the previously collected real-time data may be length of traversal time information related to how fast a line is moving and at what rate the line was growing. Optionally, the real-time data may be traversal information for the selected destination location and the prediction data may be traversal information previously collected for the selected destination location.

Other embodiments include methods, systems, and devices where, for example a system embodiment may include: (i) a computing device comprising a processor and addressable memory, (ii) a user equipment, and (iii) a plurality of detection equipment having a transmitter and a user equipment having a processor and addressable memory; where the plurality of detection equipment may be configured to: send real-time data pertaining to a selected destination location, where the real-time data comprises detected changes in surrounding environments at the selected destination location associated with length of traversal time; where the computing device may be configured to: (a) receive, from the plurality of detection equipment, real-time data pertaining to a selected destination location, where the real-time data comprises detected changes in surrounding environments at the selected destination location associated with length of traversal time; (b) select a route of travel based on the received real-time data pertaining to the selected destination location, live traffic info associated with a selected departure location, and live traffic info associated with the selected destination location; (c) determine a departure time for a predetermined arrival time at the selected destination location, the determination based on the selected route of travel, the selected departure location, and the selected destination location; and (d) transmit, to the user equipment, the determined departure time for the predetermined arrival time and the selected route of travel associated with the user equipment; and where the user equipment may be configured to: receive, from the computing device via a push notification, the determined departure time for the predetermined arrival time and the selected route of travel associated with the user equipment, thereby allowing the user of the user equipment to depart from the selected departure location at a specified time in order to arrive at the selected destination location at the predetermined arrival time.

Optionally, the computing device may be further configured to determine a departure time for a predetermined arrival time based on prediction data associated with the selected destination location, where the prediction data may comprise previously collected real-time data and is received by the computing device on a continual basis from the plurality of detection equipment. Additionally, the real-time data and the previously collected real-time data may be length of traversal time information related to how fast a line is moving and at what rate the line was growing, where the real-time data may be traversal information for the selected destination location and where the prediction data may be traversal information previously collected for the selected destination location.

BRIEF DESCRIPTION OF THE DRAWINGS

Embodiments are illustrated by way of example and not limitation in the figures of the accompanying drawing, and in which.

DETAILED DESCRIPTION

The present application discloses methods, devices, and systems for allowing a traveler or user to anticipate travel time to, for example, an airport, and wait times at lines at the exemplary airport. Additionally, different routes may be suggested to the user to help them—once notified of the travel times—to traverse such routes in a timely manner. An autonomous traversal determination system is disclosed as comprising a number of sensors, processors, and mobile devices.

Disclosed are systems and devices for, and methods of, determining departure and total traversal durations for traveling from a current location to a final destination; and more particularly, to methods and devices for dynamically gathering information related to the potential travel time and wait time at transport facility lines. Embodiments of the autonomous traversal determination system may detect or measure a bottleneck or delay property and transmit such information to a server computing device. Such information may optionally be collected from other user devices travelling in similar areas and traversing similar routes. The server computing device may then determine a total time necessary for arriving at the destination transportation facility and then transmitting that information to the user, e.g., traveler, to help plan their departure. Thereby, the server computing device may provide an autonomous system for the determination of departure times and keeping a user informed of when they need to depart from their current location in order to not only arrive at the destination facility but also to traverse any hurdle, such as lines, for arrival at a final destination within the destination facility.

Figure 1:
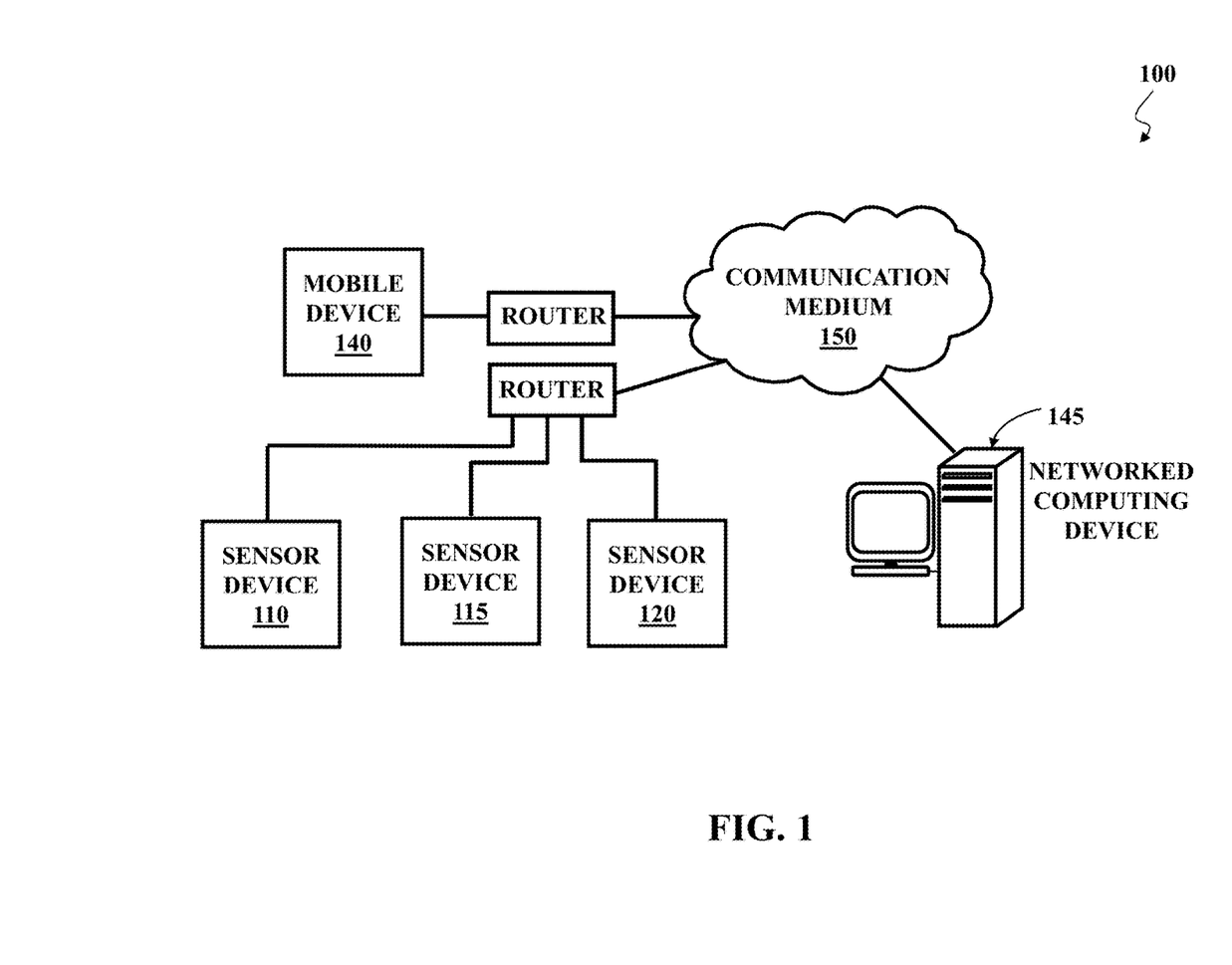
FIG. 1 depicts a functional block diagram of a computing system comprising a number of sensor devices in communication with a networked computing device and a mobile device.

FIG. 1 is an exemplary functional block diagram depicting an embodiment of an autonomous traversal determination system 100. Embodiments of the autonomous traversal determination system 100 may be executed in real time or near real time. In this exemplary functional block diagram, a plurality of detection equipment, e.g., sensor devices 110, 115, 120, may be connected to a communication medium 150 via a router, where the communication medium 150 also effects connecting a networked computing device 145, e.g., server, and a mobile device 140. Via the communication medium 150 the sensor devices 110, 115, 120 may continuously transmit data pertaining to the flow of conveying of people or goods from place to place, to the networked computing device 145 for processing. The transmission may be asynchronous, meaning as not requiring a common clock between the communicating devices; or a scheme for synchronous notification may be utilized. The networked computing device 145 may determine an estimation of time required for traversing the obstacles based on the transmitted data from the sensor devices 110, 115, 120, combined with other information acquired relating to, for example, traffic. Subsequent to the determination of the estimated time, the departure information may then be determined based on the estimated traversal and communicated to the mobile device 140, for example, as a push notification.

Embodiments of the autonomous traversal determination system 100 may, via sensor devices 110, 115, 120 track persons or objects on the move at the actual transport facility lines and provide a timely ordered sequence of respective location data to a networked computing device 145, e.g., capable of depicting the motion, and determine the length of time required to transverse the line. The sensor devices 110, 115, 120 may detect movement or changes in the area they are designated to cover, and then provide a corresponding output to be transmitted to a local computing device or via the communication medium 150 to a networked computing device 145 outside of the local network. In one embodiment, each sensor device may be equipped with its own communication system, for example, a transceiver or just a transmitter, without the need to communicate with the other sensor devices. Other embodiments may comprise a system of sensors connected to each other via encoded messages as a sequence of signals using a specific channel, where the information collected may be grouped together and transmitted in real-time or near real-time to computing devices for processing. Optionally, information from mobile devise of other users may be used in lieu of, or in addition to, sensor data.

Embodiments of the autonomous traversal determination system utilize a departure determining tracking system used for providing line-tracking services, for the exemplary purpose of putting users and consumers on notice of the latest possible time they should leave to their destination transport facility, e.g., airport. The system may perform this by combining:

(1) Map data—indicates how long a specific route to the airport—given traffic—should take based upon either the consumers current location or a desired location;

(2) Line Data—sensors in the line posts that may track: (a) how full either the airline's check-in line or (b) the airport's security line/TSA line is at a given time (where the tracking is done based on an exemplary scaling factor of 0-100%); and (3) Calculation and Transmission of information—The information from the sensors in each post may be transferred—either via Wi-Fi, Bluetooth technology, or other technological means—to a secure location where all of the information may be processed and combined to determine a time to leave for the airport. The determined time may then be transmitted to the consumer via email, SMS, MMS, telephone call, or an application notification, e.g. push notification, alerting them of the time needed to depart.

Figure 2:
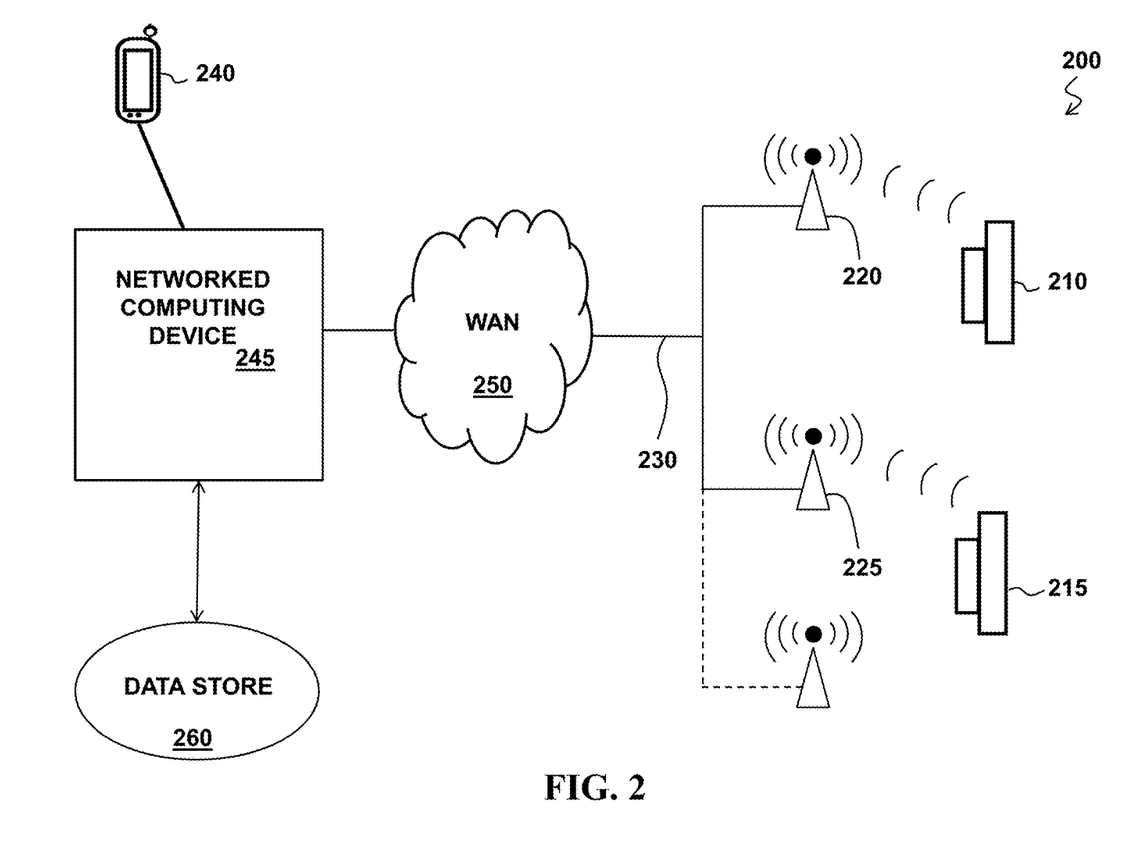
FIG. 2 depicts an exemplary embodiment of a computing system that includes a user equipment (UE), a plurality of sensors devices, and a networked computing device connected to a data store.

FIG. 2 depicts, in a functional block diagram, one embodiment of the autonomous traversal determination system 200, where the system may combine collected real-time and historical traffic data with real-time and historical line wait time data. This may be accomplished via, for example, accessing a remote data store 260, i.e., database or collecting and accumulating such information from a plurality of user mobile devices 240. That is, the line tracking system may use an underlying map service (i.e., Google Maps, Waze, Apple Maps), at the start of the consumer experience to provide the consumer real-time information relating to how long it will take them to get from either: (a) their current location or (b) a desired location. The map information may, for example, provide an accurate estimation, as is currently done with all map services, on how long the trip should take given traffic changes and other instances that affect the time it takes to move through traffic. The networked computing device 245 may then combine that information related to traffic with information received from sensor devices 210, 215. In this embodiment, the sensor devices 210, 215 may via a series of transceivers 220, 225 communicate the information to a wide area network (WAN) 250 extending over a large geographical distance, with the networked computing device 245 as the destination. Once received, the networked computing device 245 may determine an appropriate departure time for the mobile device 240 based on the historical data received from the data store 260 and information received from the sensor devices 210, 215.

Figure 3:
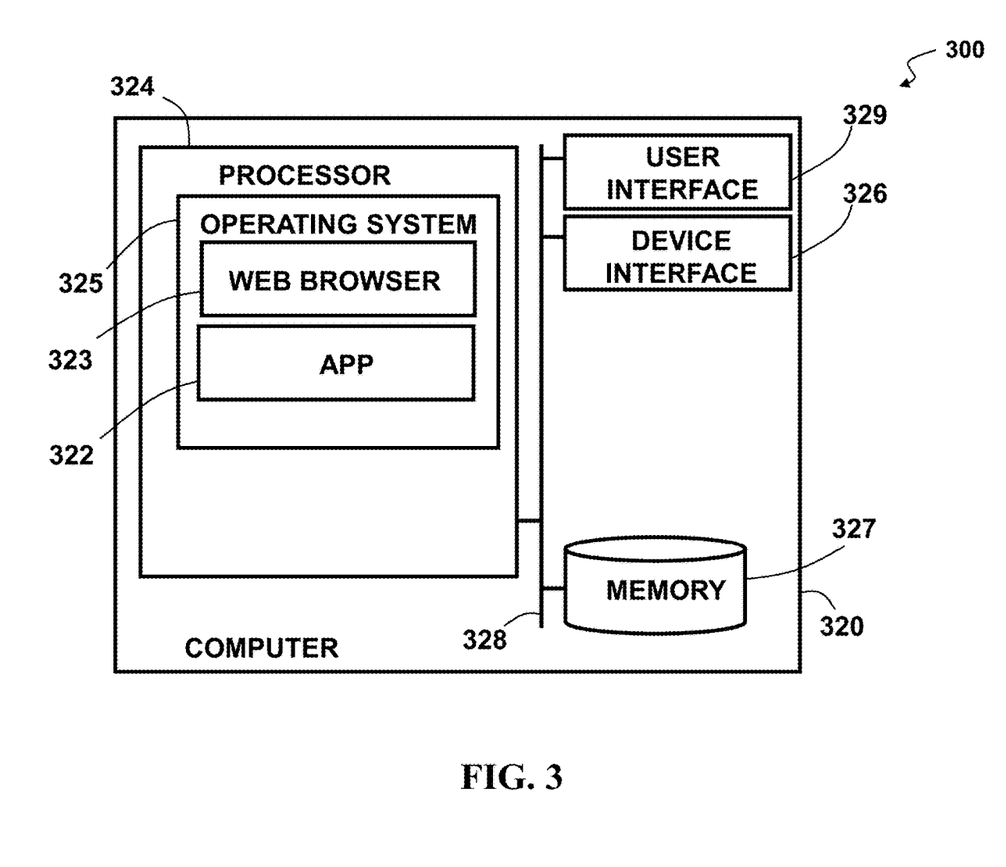
FIG. 3 illustrates an exemplary top-level functional block diagram of a computing device embodiment.

FIG. 3 illustrates an exemplary top level functional block diagram of a computing device embodiment 300. The exemplary operating environment is shown as a computing device 320 comprising a processor 324, such as a central processing unit (CPU), addressable memory 327, an external device interface 326, e.g., an optional universal serial bus port and related processing, and/or a Communication or Network Communication port and related processing, and an optional user interface 329, e.g., an array of status lights and one or more toggle switches, and/or a display, and/or a keyboard and/or a pointer-mouse system and/or a touch screen. Optionally, the addressable memory may, for example, be: flash memory, EPROM, and/or a disk drive or other hard drive. These elements may be in communication with one another via a data bus 328, and via an operating system 325 such as one supporting a web browser 323 and applications 322, the processor 324 may be configured to execute steps of a process for determining the departure and total traversal durations for traveling from a current location to a final destination.

Additionally, embodiments may be implemented as an application running on a mobile device, e.g., smartphone, or be implemented as a web based service. Embodiments of the line tracking system may be disclosed by example, as devices, systems, and methods, and may be embodied as an application running on one or more processors, e.g., an Apple®, Google® Android, and/or Windows® phone application running on a smartphone and/or one or more remote servers and/or computers. That is, a scheme for taking into account how long it may take to make it to the actual airport based on traffic conditions, may be implemented where the time to travel to the airport may be combined with how long it may take to traverse the lines at the airport. Accordingly, the total time necessary to make it from one's present location, or anticipated location, to the gate of an airline may be precisely predicted and determined.

Embodiments of the autonomous traversal determination system provide techniques, where in addition to the traffic data, the system may use a prediction method that takes into account the actual wait time for specific lines at the transportations facility, for example, airport. Accordingly, the system may estimate total travel time from a specific location to an airline gate at the airport with speed and accuracy. In this embodiment, sensors may be utilized and embedded in the areas surrounding lines associated with the traveler or user's itinerary to collect data and report that data to the line tracking system. For example, a sensor may detect events or changes in its environment, and then provide a corresponding output; where a sensor may be a type of transducer; and where sensors may provide various types of output, but typically use electrical or optical signals. In one exemplary embodiment, the sensors may be placed or embedded within the line posts thereby having close proximity to the other people and travelers standing in line. Other means or utility well known in the art may also be used. Thereby, sensors— placed in areas where a line may be formed at the particular facility that a specific traveler or user may be required to wait in and pass—may measure physical quantities and convert them into signals that can be read by observers or by instruments. More particularly, such signals may be received by a computing device that may be in communication with a user equipment, e.g., handheld device, being used by the traveler or user.

Figure 4:
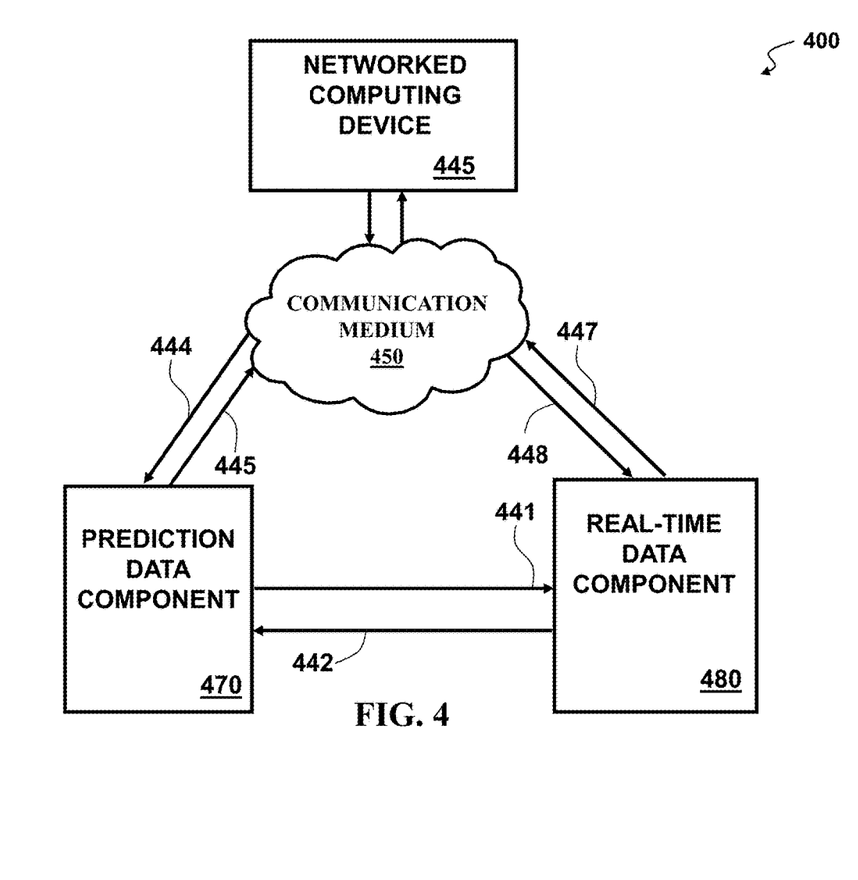
FIG. 4 depicts a functional block diagram of a networked computing device embodiment in communication with a prediction data component and real-time data component.

FIG. 4 depicts an embodiment, in a functional block diagram, of the autonomous traversal determination system 400 where the networked computing device 445 may be in communication through a communication medium 450 with a prediction data component 470 and real-time data component 480. The combination of historical data for prediction purposes along with real-time data and traffic predication technology may enable the system to accurately predict a total length of time which may be required to not only arrive at the destination but also to traverse any obstacles necessary in order to timely accomplish arrival at a location within, for example, a transportation facility or event stadium. By the autonomous traversal determination system 400 using sensors within a facility, the need for line of sight may no longer be required for a location and traversal determination. This is a significant advantage in certain applications since a GPS signal may be lost indoors and current methods of arrival prediction may not suffice. It is well known that within a transportation facility or public event it may be extremely difficult to anticipate amount of time needed to traverse certain sections or lines. For example, at a public gathering or assembly, at sporting events, at conventions, airports, train stations, etc., a person's ability to get around to different areas and destinations within the venue may greatly be affected depending on a number of factors.

In order to account for the aforementioned factors, the autonomous traversal determination system 400 may, as depicted in FIG. 4, request 444 prediction data and in return receive prediction data information 445 from the prediction data component 470 on a continual basis. The autonomous traversal determination system 400 may also request 448 real-time data and cause real-time data information 448 to be transmitted from the real-time data component 480. In one exemplary embodiment, the networked computing device 445 may implement a time-based dependence of the system's output on present and past inputs, i.e., hysteresis affect. That is, the prediction data component 470 may process the past inputs and transmit prediction data 445 to be used in conjunction with received real-time data 447 from the real-time data component 480. In addition, the prediction data component 470 and the real-time data component 480 may be in direct communication 441, 442 with each other where the prediction data component 470 may take as input real-time data readings received from sensor devices at the destination location. As described, some exemplary prediction data associated with the traversal time at a specific location, may include the time of day and historical information of how many staff are working, how fast the particular staff works, or how crowded the lines are during that time, how full a flight may be or how many tickets have been purchased, how full the check-in line at the traveler's desired airline is during that season, and data relevant to traversing such line which may be affected based on a number of different factors, such as: time, date, season, schedule, and/or any other human trends.

Accordingly, the system, via sensors embedded in each of the line posts, either in the form of lasers, sensors, cameras, etc., may determine the number of people in the line and how long it should take for a traveler at the line's current "fullness" to make it from the back to the front of the line. The system may take into account, for example, the time of day and historical information of how many staff are working, how fast the particular staff works or how crowded the lines are during that time. Additionally, data related to how full a flight may be or how many tickets have been purchased, i.e., whether event is sold out, may be used. In an exemplary embodiment, by calculating how full the check-in line at the traveler's desired airline is, data relevant to traversing such line may be made available to the traveler or user who has not yet reached the airport. As the sensors are placed in the post, the presence of an individual breaking a sensor's path, given the posts' location in the chain of posts may indicate that the line has gotten to that post's position and thus the line is that full. Additionally, given the sensor readings, the system may determine how fast the line is moving and at what rate the line may be growing. In one embodiment, this information may be transmitted continuously, via Wi-Fi or Bluetooth, to a server or prediction data component so that patterns may be determined and identified, thereby allowing better estimations to be made and presented to the traveler or user.

Figure 5A:
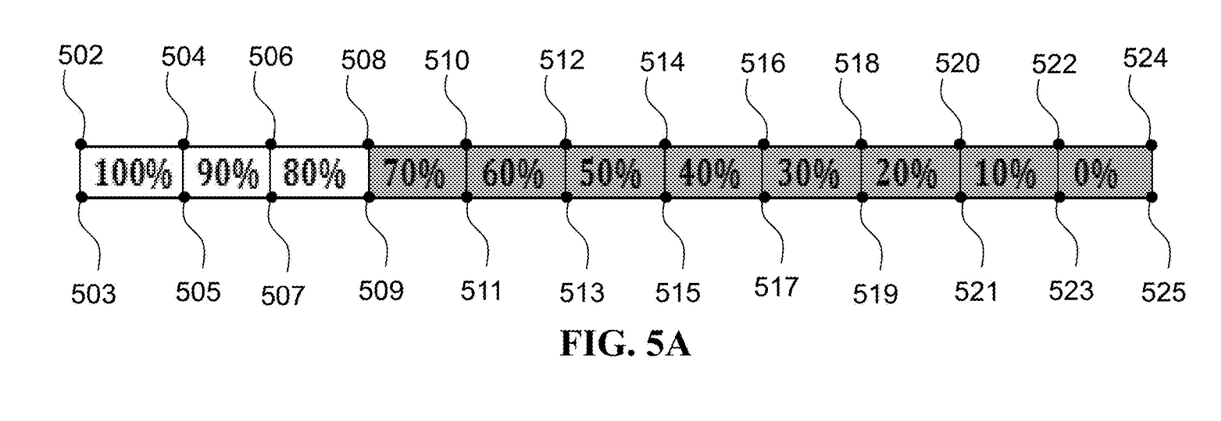
FIG. 5A depicts a graphical representation of the notification of line fullness.
Figure 5B:
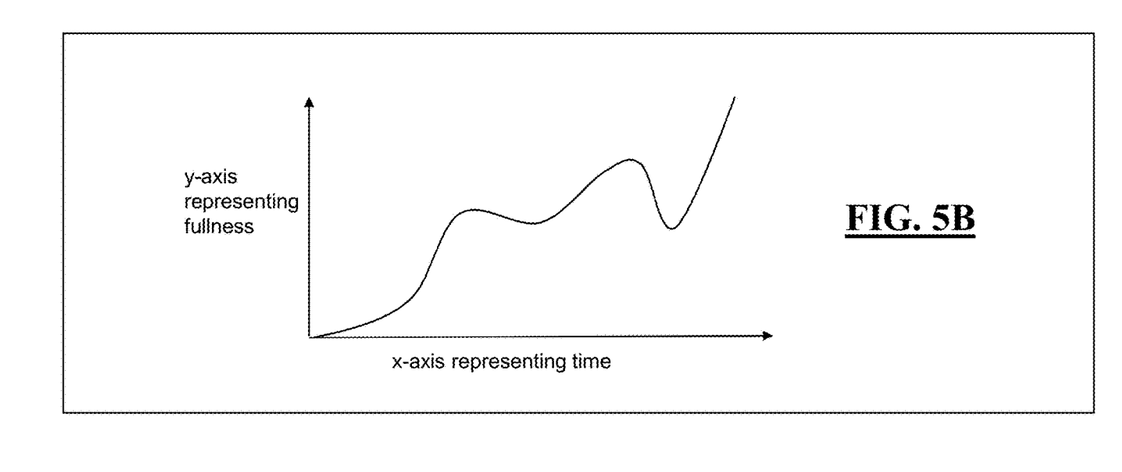
FIG. 5B depicts a graphical representation of the scaling factor for line fullness.

The line tracking system may also include a Global Positioning System (GPS) providing information on the user's location so as to facilitate the real-time updating of information related to the user's current status in relation to the airport lines. That is, the system may prepopulate information on the user's location and movement relating to the current itinerary based on the location of the device. Accordingly, that information may be viewable to the consumer on the web service/application as provided in the exemplary illustration of FIG. 5A. FIG. 5A depicts a scenario where the notification conveys: "The Line You are Currently Looking at is 70% full, given the day, date and time of your estimated arrival to the airport, it should take you 35 minutes to go from start to finish of the line." FIG. 5A further depicts a set of line posts 502-524 and 503-525 each comprising a plurality of detection equipment, e.g., sensors, grouped at a specific location. For example, the depicted group of line posts form a line where movement may be tracked based on tracking and reading information from each sensor to determine how full the line is. That is, if a sensor senses a person standing in the proximate or immediate distance, depending on the position of the sensor, the fullness of the line may be tracked. In this figure, each of the pair of sensors 508-524 and 509-525 appear as grayed out and indicating that someone may be present in the line, whereas sensors 502-506 and 503-507 are not showing anyone in the proximity, hence the line is 70% full. In one embodiment, the sensors may be in communication with each other, an associated paired sensor, or with a computing device that may be monitoring the readings in real time and determining how fast a line is moving and at what rate the line was growing. FIG. 5B depicts a graphical representation of the scaling factor for line fullness showing the x,y axes, where x is the traversal time and y is the percentage of fullness. The graph shows the line fullness fluctuating with time and therefore determining a different scaling factor based on the line data.

The exemplary embodiments of the networked computing devices relate to techniques for determining an appropriate time for a traveler or user to leave their current destination and make it to their flight or event. These embodiments may apply to broadcast networks, wired or wireless, and to specifications or standards, including those that may later be developed. In one embodiment, sensor readings may be streamed to mobile devices using wireless local area network (WLAN) products that may be based on the Institute of Electrical and Electronics Engineers' (IEEE) 802.11 standards, for example, wireless WiFi®, or other wireless networks with broadcast methods such as Long Term Evolution (LTE). The mobile devices may act as a display and show, for example, multiple views of potential lines the user has to traverse to get to their final destination, e.g., airline gate. Devices that may use WLAN, for example, mobile phones, specifically smartphones, personal computers, tablets, and/or digital audio players, may connect to a network resource such as the Internet via a wireless network access point. In one embodiment, the system may manage large numbers of mobile devices in a crowded environment; via, for example, sending push notifications at a time that user needs to leave their current location in order to make it to the destination on time. Such notifications may be determined on a continuous manner and periodically updated.

The system and method embodiments may provide a computing device, having a processor and memory, for receiving the information transmitted by the sensors for processing and communicating to the mobile devices of the users. The method may include receiving a set of sensor readings associated with each line at a particular location and then storing the information in a data store for the appropriate location. The information may then be made available based on a set of requests. The system may then associate a user with a specified path to their destination, where the path may include the travel route to get to the transportation facility and the route they need to take once inside, to get to their desired gate for departure. A list of paths may then be retrieved that is determined based on the shortest travel time, wait time, and distance for the user. Once a selection of the path is made by the user, the computing device, e.g., a processor and resource for storing information, may determine a time interval necessary to achieve the arrival at the final destination. A synchronous, asynchronous, or combinations thereof, computing may use the corresponding information to retrieve and alert the user of the time they need to depart from their location or another location. In some embodiments, a secondary process may be created to monitor in real-time the travel time previously calculated and update it according to any changes to the traffic and/or wait time. Accordingly, the departure time of the user, i.e., total time, may be updated in real-time allowing the user to update their plans.

Exemplary embodiments of the line track system may track multiple lines that may be necessary for the user to traverse. For example, check-in line time and security line time at the remote location, e.g., airport, may both be tracked via the exemplary sensors and based on historical data in conjunction with past and present trends, determine an estimation of how long a currently composed line will take for the traveler or user to make his/her way from start to finish. Accordingly, as many lines as necessary may be monitored and considered in the prediction process.

The embodiment may comprise a recipient device comprising an operating system and a data store, a sensor device comprising an operating system and a data store, and a computing device comprising an operating system and a data store. The system effects the streaming of the line wait-time information data based on a request received from a traveler or user of the operating device. The devices may comprise an application program running on the operating system to process streaming of line wait-time information that may have been synchronized with other information. That is, the sensor device may then communicate the line wait-time information along with a set of associated information to the recipient device which will then be able to display/relay the relevant information.

The sensor device may transmit the associated information to the recipient device via the server computing device and via, for example, wireless WiFi®, wireless local area network (WLAN), or other wireless networks with broadcast methods such as Long Term Evolution (LTE), Bluetooth, and/or any other hardware or software radio broadcast methods. The server computing device may connect and work with any such devices that may use LTE or WLAN, for example, mobile phones, specifically smartphones, personal computers, tablets, televisions, and/or digital cameras, to connect to a network resource such as the Internet via wired or wireless communication.

The computing device, or server, that is configured to execute these steps may be a link processing component that links the sensor data and the traffic data—that may have been acquired by a data acquiring component—with each other. If the relevant information data is not present, the link processing component may query a separate component, for example, a data acquiring component, to acquire the corresponding data and store it in a storage component so as to determine the prediction time for traversing to the desired destination. Some embodiments may support the two steps as the traffic portion of the service and the line tracking portion of the service that when added together may provide an accurate estimation of the best time for a traveler to head to the airport. The sensors in the posts and the accumulation of data from those posts using sensors/lasers/cameras and the transmission of that data via Bluetooth or Wi-Fi may be incorporated for methods of performing the disclosed determinations. As such, the method may also include downloading and displaying data in real-time on the user device whereby the user may then make their own determinations as well as following the prediction data provided by the line tracking system.

In one embodiment, the data communication between the devices may be via, for example, a User Datagram Protocol (UDP) which is a transport layer protocol defined for use with the IP network layer protocol. In one exemplary embodiment, a push data mechanism may be implemented via TCP/IP protocols and the line tracking time updates may be sent in real-time. Each mobile device may comprise an embedded web application server that may allow executable applications or scripts, e.g., application software, that may be available in versions for different platforms and are to be executed on the mobile device. Applications may be developed to support various mobile devices and their respective operating systems such as: iOS, Android, and Windows.

Figure 6:
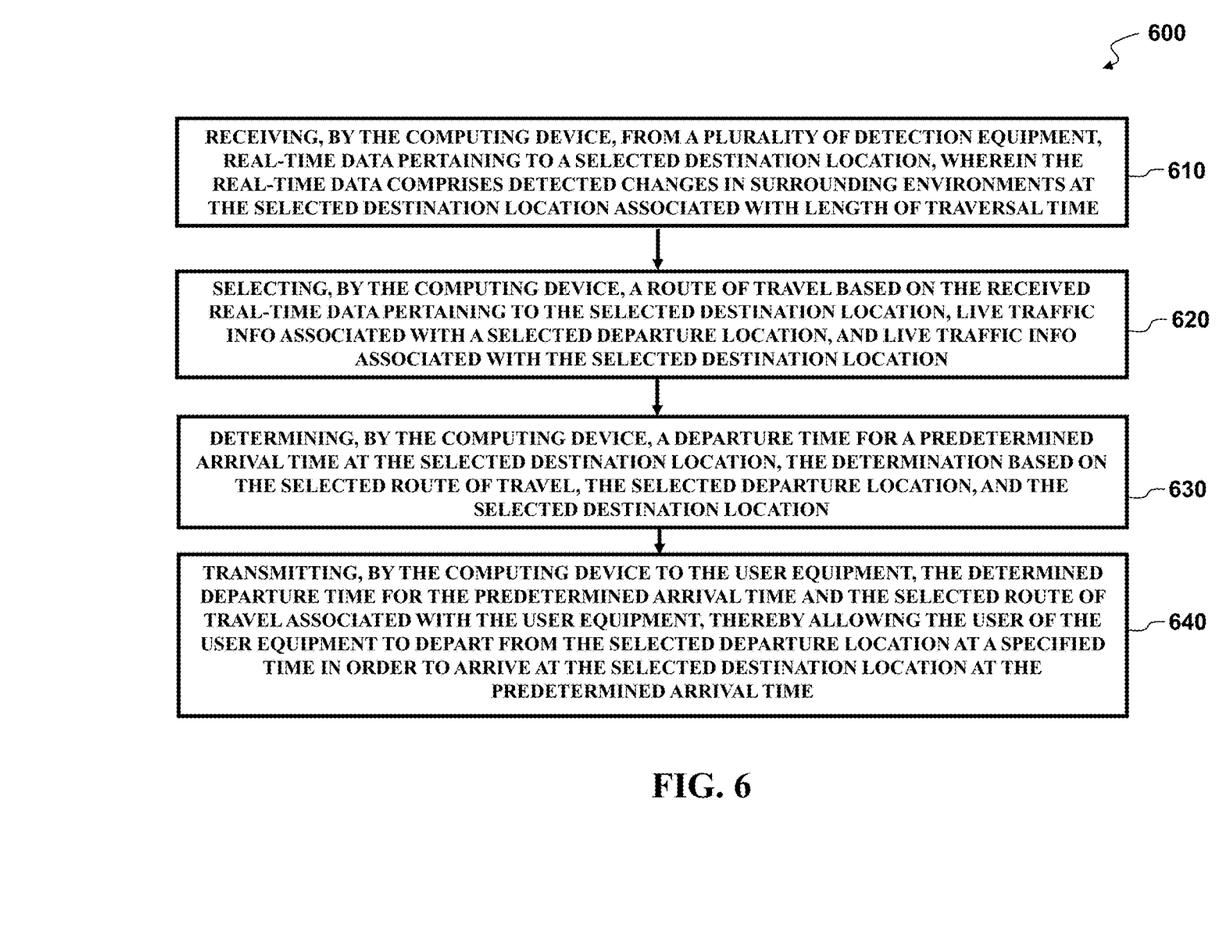
FIG. 6 is a flow chart of an exemplary top-level functional process of a server computing device embodiment.

FIG. 6 is a flow chart of an exemplary top-level functional process of a computing device embodiment that may include an exemplary method of implementation of a computing device that determines a departure time for a predetermined arrival time at the selected destination location. The exemplary method of the system and associated computing devices may comprise the following steps: receiving, by a computing device comprising a processor and addressable memory, from a plurality of detection equipment, real-time data pertaining to a selected destination location, wherein the real-time data comprises detected changes in surrounding environments at the selected destination location associated with length of traversal time (step 610); selecting, by the computing device, a route of travel based on the received real-time data pertaining to the selected destination location, live traffic info associated with a selected departure location, and live traffic info associated with the selected destination location (step 620); determining, by the computing device, a departure time for a predetermined arrival time at the selected destination location, the determination based on the selected route of travel, the selected departure location, and the selected destination location (step 630); and transmitting, by the computing device to the user equipment, the determined departure time for the predetermined arrival time and the selected route of travel associated with the user equipment, thereby allowing the user of the user equipment to depart from the selected departure location at a specified time in order to arrive at the selected destination location at the predetermined arrival time (step 640).

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A device comprising:
a processor and addressable memory, the addressable memory comprising a set of one or more rules, wherein the device is in communication with a plurality of detection equipment embedded in a set of line posts and having a transmitter, and a user equipment having a processor and addressable memory, wherein the processor of the device is configured to:
receive, from the plurality of detection equipment at a selected destination location, real-time data pertaining to the selected destination location requiring a traversal time to travers a path at the selected destination to arrive at a specified area within the selected destination location, wherein the real-time data comprises detected changes in surrounding environments at the selected destination location to determine a length of local traversal time within the selected destination location, the determination based on the plurality of detection equipment embedded in the set of line posts reading line data to monitor the traversal time;
select a route of travel from a departure location to the selected destination location, based on live traffic info associated with the selected departure location to the destination location, and the live traffic info being received as real-time data;
determine a departure time for a predetermined arrival time at the specified area within the selected destination location, wherein the determination is based on the selected route of travel from the selected departure location to the selected destination location, and the determined length of local traversal time within the selected destination location; and
transmit, to the user equipment, the determined departure time for the predetermined arrival time and the selected route of travel associated with the user equipment, thereby allowing the user of the user equipment to depart from the selected departure location at a specified time in order to arrive at the selected destination location at the predetermined arrival time.

2. The device of claim 1 wherein the device is further configured to determine a departure time for a predetermined arrival time based on prediction data associated with the selected destination location.

3. The device of claim 2 wherein the prediction data comprises previously collected real-time data and is received by the device on a continual basis.

4. The device of claim 3 wherein the real-time data and the previously collected real-time data are length of traversal time information related to how fast a line is moving at the specified area within the selected destination location and at what rate the line was growing at the specified area within the selected destination location.

5. The device of claim 4 wherein the real-time data is traversal information for the selected destination location and wherein the prediction data is traversal information previously collected for the selected destination location.

6. The device of claim 1 wherein the real-time data is collected from a plurality of other user equipment present at the selected destination location showing a rate of movement in traversing the path at the selected destination location.

7. The device of claim 1 wherein the plurality of detection equipment are a set of one or more sensors.

8. The device of claim 7 wherein the detected changes in surrounding environments at the selected destination location is based on data received from the set of one or more sensors.

9. The device of claim 8 wherein the detected changes in surrounding environments at the selected destination location is further based on a flow of movement tracked by the set of one or more sensors for a group of line posts within the specified area.

10. The device of claim 9 wherein the device is further configured to determine line wait time information via the line data associated with a scaling factor.

11. The device of claim 10 wherein the line wait time information is further based on historical information associated with the specified area, the historical information comprising at least one of: number of staff working during that time, how fast the particular staff works, and how crowded the lines are during that time.

12. A method comprising:
receiving, by a computing device comprising a processor and addressable memory, from a plurality of detection equipment embedded in a set of line posts, real-time data pertaining to a selected destination location requiring a traversal time to travers a path at the selected destination to arrive at a specified area within the selected destination location, wherein the real-time data comprises detected changes in surrounding environments at the selected destination location to determine a length of local traversal time within the selected destination location, the determination based on the plurality of detection equipment embedded in the set of line posts reading line data to monitor the traversal time;
selecting, by the computing device, a route of travel from a selected departure location to the selected destination location, based on live traffic info associated with the selected departure location, and the live traffic info being received as real-time data;
determining, by the computing device, a departure time for a predetermined arrival time at the specified area within the selected destination location, wherein the determination is based on the selected route of travel from the selected departure location to the selected destination location, and to the selected destination location, and the determined length of local traversal time within the selected destination location; and transmitting, by the computing device to the user equipment, the determined departure time for the predetermined arrival time and the selected route of travel associated with the user equipment, thereby allowing the user of the user equipment to depart from the selected departure location at a specified time in order to arrive at the selected destination location at the predetermined arrival time.

13. The method of claim 12 wherein determining a departure time for a predetermined arrival time is further based on prediction data associated with the selected destination location.

14. The method of claim 13 wherein the prediction data comprises previously collected real-time data and is received by the computing device on a continual basis.

15. The method of claim 14 wherein the real-time data and the previously collected real-time data are length of traversal time information related to how fast a line is moving at the specified area within the selected destination location and at what rate the line was growing at the specified area within the selected destination location.

16. The device of claim 15 wherein the real-time data is traversal information for the selected destination location and wherein the prediction data is traversal information previously collected for the selected destination location.

17. A system comprising a computing device comprising a processor and addressable memory, a user equipment, and a plurality of detection equipment embedded in a set of line posts and having a transmitter and a user equipment having a processor and addressable memory;

wherein the plurality of detection equipment embedded in the set of line posts are configured to:
  send real-time data pertaining to a selected destination location, wherein the real-time data comprises detected changes in surrounding environments at the selected destination location to determine a length of local traversal time within the selected destination location, the determination based on the plurality of detection equipment embedded in the set of line posts reading line data to monitor the traversal time;
wherein the computing device is configured to:
  receive, from the plurality of detection equipment, real-time data pertaining to a selected destination location, wherein the real-time data comprises detected changes in surrounding environments at the selected destination location associated with length of traversal time;
  select a route of travel from a departure location to the selected destination location, based on live traffic info associated with a selected departure location, and live traffic info associated with the selected departure location to the destination location, and the live traffic info being received as real-time data;
  determine a departure time for a predetermined arrival time at the specified area within the selected destination location, wherein the determination is based on the selected route of travel from the selected departure location to the selected destination location, and the determined length of local traversal time within the selected destination location; and
  transmit, to the user equipment, the determined departure time for the predetermined arrival time and the selected route of travel associated with the user equipment; and
wherein the user equipment is configured to:
  receive, from the computing device via a push notification, the determined departure time for the predetermined arrival time and the selected route of travel associated with the user equipment, thereby allowing the user of the user equipment to depart from the selected departure location at a specified time in order to arrive at the selected destination location at the predetermined arrival time.

18. The system of claim 17 wherein the computing device is further configured to determine a departure time for a predetermined arrival time based on prediction data associated with the selected destination location.

19. The system of claim 18 wherein the prediction data comprises previously collected real-time data and is received by the computing device on a continual basis from the plurality of detection equipment.

20. The system of claim 19 wherein the real-time data and the previously collected real-time data are length of traversal time information related to how fast a line is moving and at what rate the line was growing, wherein the real-time data is traversal information for the selected destination location and wherein the prediction data is traversal information previously collected for the selected destination location.

* * * * *

UNITED STATES PATENT AND TRADEMARK OFFICE
CERTIFICATE OF CORRECTION

PATENT NO.        : 9,903,730 B1
APPLICATION NO.   : 15/362581
DATED             : February 27, 2018
INVENTOR(S)       : Tamerat S. Berhe, Bennett Jackson and Natnael S. Berhe Page 1 of 1

It is certified that error appears in the above-identified patent and that said Letters Patent is hereby corrected as shown below:

Column 11, Claim 1, Line 41: the text "traversal time to travers a path at the selected destination" should instead read "traversal time to traverse a path at the selected destination"

Column 12, Claim 12, Line 51: the text "requiring a traversal time to travers a path at the selected" should instead read "requiring a traversal time to traverse a path at the selected"

Signed and Sealed this
Thirty-first Day of July, 2018

Andrei Iancu
*Director of the United States Patent and Trademark Office*